Figure 15:
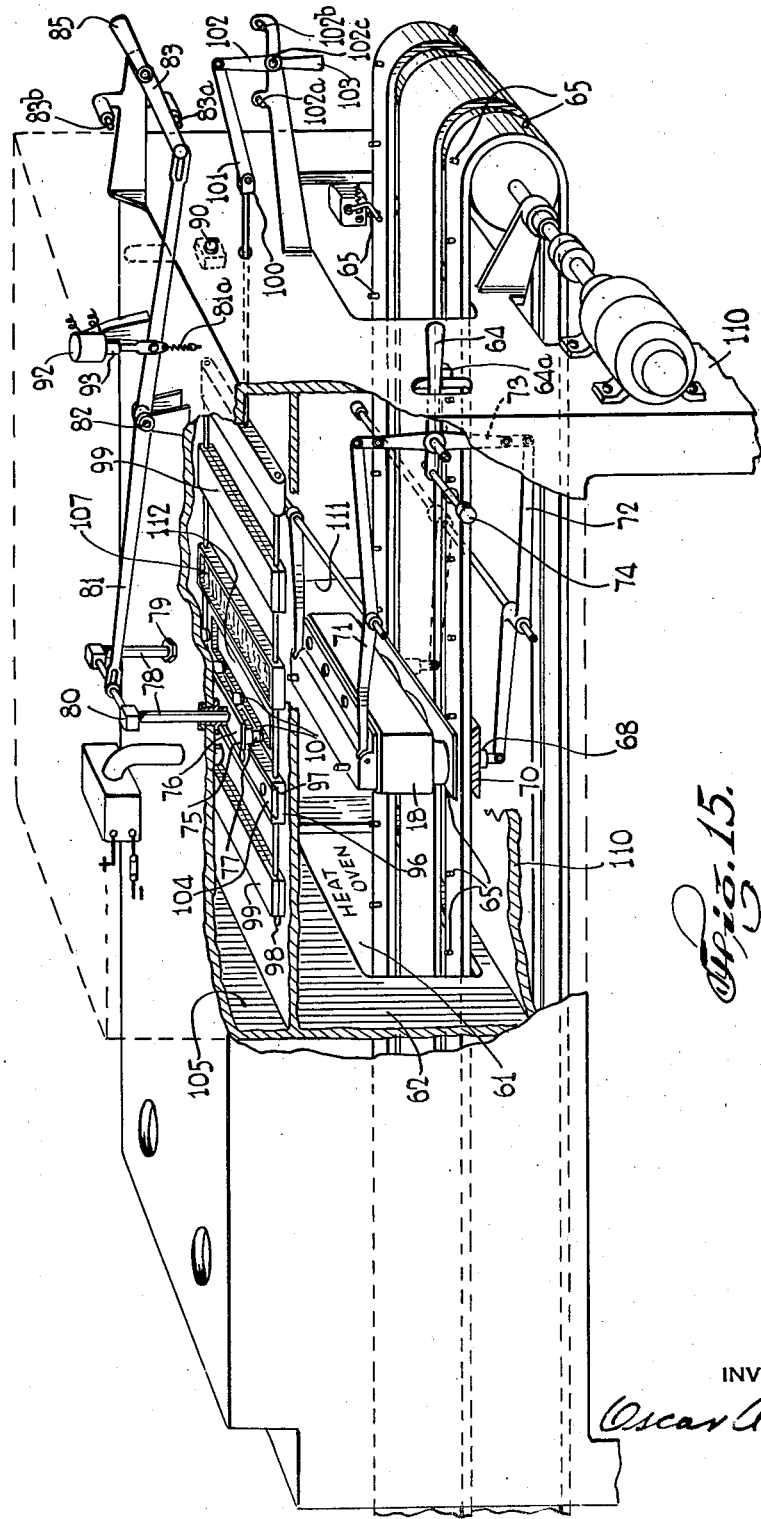

Oct. 22, 1940.  O. A. ROSS  2,218,722
SYSTEM FOR INSERTING VALVE SEAT INSERTS
Filed July 13, 1936  3 Sheets-Sheet 1
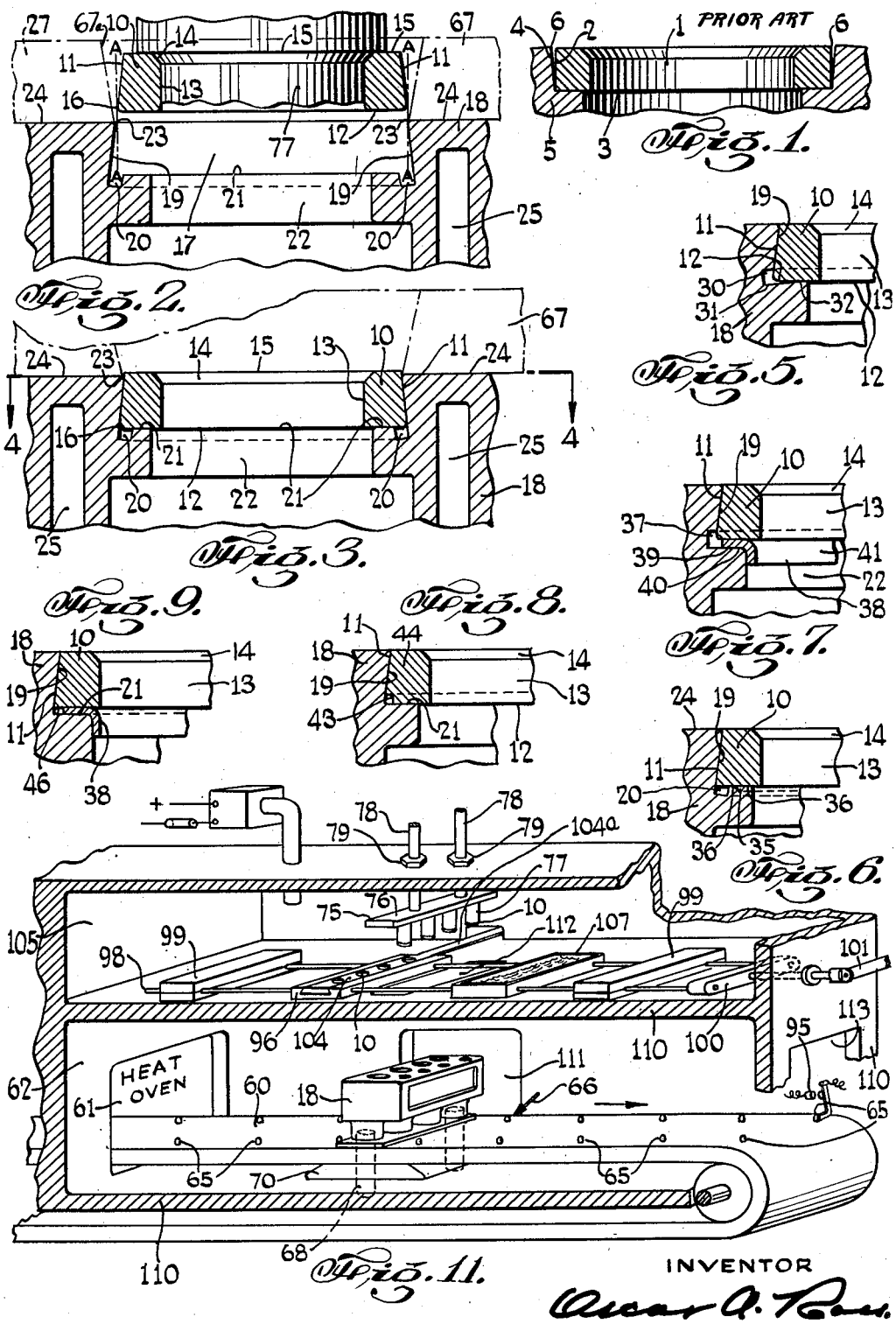
INVENTOR
Oscar A. Ross

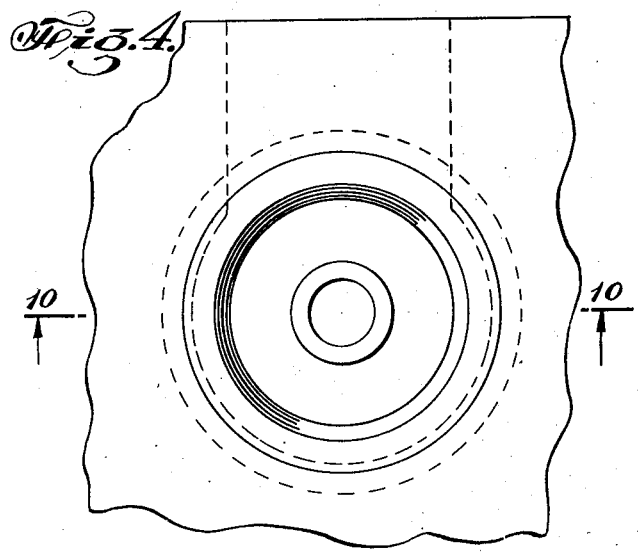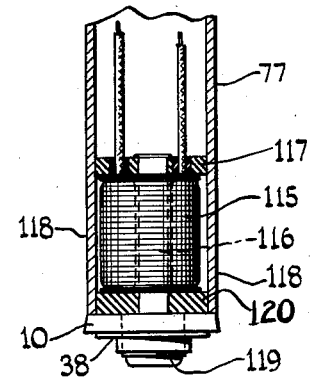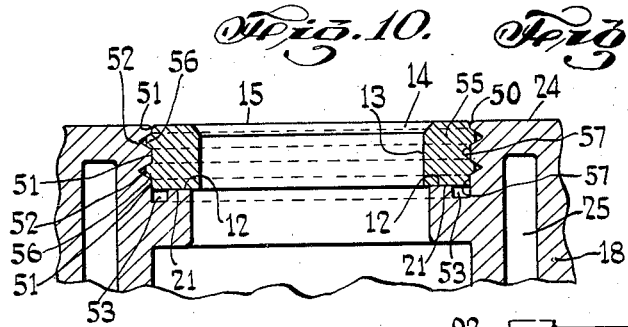

Oct. 22, 1940.  O. A. ROSS  2,218,722
SYSTEM FOR INSERTING VALVE SEAT INSERTS
Filed July 13, 1936    3 Sheets-Sheet 3

INVENTOR
Oscar A. Ross.

Patented Oct. 22, 1940

2,218,722

UNITED STATES PATENT OFFICE 2,218,722

SYSTEM FOR INSERTING VALVE SEAT INSERTS

Oscar A. Ross, New York, N. Y.

Application July 13, 1936, Serial No. 90,344

10 Claims. (Cl. 29—88.2)

This invention refers to valve seat inserts and methods of forming and inserting the same in metal bodies such as cylinder blocks of hydrocarbon motors.

This invention comprehends a valve seat insert of peculiar form in combination with a valve seat insert retaining recess also of correlated peculiar form in a metal body which when assembled together by a peculiar process form a gas tight bond therebetween and said units become permanently interlocked against separation or relative movement therebetween.

This invention further comprehends producing a positive interlock between a valve seat insert and a metal body without the use of screw threads, separate retainers or other auxiliary parts or special forming of a metal body after insertion for holding said inserts in place.

This invention further comprehends a valve seat insert assembly of low manufacturing cost capable of being produced on a mass production basis.

This invention further comprehends a peculiar process or mode of inserting valve seat inserts into correlated recesses in cylinder blocks or other metal bodies wherein the passage of a gas or liquid is controlled by the opening and closing of a valve arranged to seat in said inserts, said process for inserting said inserts being effected with a minimum of manual labor.

This invention further comprehends peculiar apparatus for differential heat treatment of valve seat inserts and cylinder blocks or other metal bodies, and during such differential heat treatment automatically conveying said inserts and cylinder blocks in interrelated paths for assembly of said units while in the heat treated state or condition.

This invention further comprehends a peculiar mode of conveying valve seat inserts and cylinder blocks or other metal bodies during the differential heat treatment and assembly thereof whereby a minimum of space in the heat treatment chambers is required and maximum production is obtained.

Other advantages will be apparent as the description of the invention progresses and the peculiar and novel features thereof will be pointed out herein.

Referring to the drawings wherein like numerals refer to corresponding parts, Fig. 1 is a sectional view of a conventional valve seat insert assembly. Fig. 2 is a sectional view of one embodiment of the invention during the process of assembly. Fig. 3 is a sectional view of the same embodiment after assembly. Fig. 4 is a plan view of the same taken on line 4—4 of Fig. 3. Fig. 5 is a part sectional view of another embodiment of the invention after assembly. Fig. 6 is still another part sectional view of still another embodiment of the invention after assembly. Fig. 7 is another part sectional view of another embodiment of the invention after assembly, and Fig. 8 is still another part sectional view of still another embodiment of the invention after assembly. Fig. 9 is another part sectional view of another embodiment of the invention after assembly. Fig. 10 is a sectional view of still another embodiment of the invention after assembly. Fig. 11 is a part sectional, part perspective view of apparatus for differential heat treatment and assembly of valve seat inserts into cylinder blocks. Fig. 12 is a part sectional, part elevational view of the automatic apparatus forming part of the system shown in Fig. 11. Fig. 13 is an enlarged sectional view of one form of insert holding device. Fig. 14 is an enlarged sectional view of another form of insert holder of which Fig. 14a is a bottom view. Fig. 15 is a perspective view showing complete assembly of the mechanisms disclosed by Figs. 11-14a inclusive.

Referring to Fig. 1 showing a conventional form of assembly including a valve seat insert 1 and a cylinder block 5. Said insert is formed with a cylindrical exterior surface 2 being pressed into a cylindrical recess 3 having cylindrical wall 4 in said block 5. When said insert is formed of steel and said block is formed of cast iron the greater expansion of said insert upon heating by exhaust gases causes an abnormal radial outward pressure on cylinder wall 4 thereby producing distortion both to said insert and said cylinder block as shown, this pressure being proportional to the press, or shrink fit therebetween and the different expansion coefficients of the metals from which these parts are made, said distortion acting to produce the opening 6 which may dislodge said insert or change its position with respect to the axes of said insert and the correlated valve seating thereon and whereby improper seating occurs resulting in gas leakage when said valve is seated on said insert.

Referring to Figs. 2, 3 and 4 disclosing one embodiment of the invention, valve seat insert 10 is formed with a frusto conical exterior wall or face 11, an annular seating or bottom face 12, a gas opening 13, a valve seating face 14, a top face 15 and a rounded corner 16.

The correlated recess 17 in cylinder block 18 comprises frusto conical face 19, frusto conical clearance groove 20 at the bottom thereof, an annular seating face 21, gas passage 22 and rounded corner portion 23 joining said frusto conical face 19 and parting face 24 of said cylinder block, said cylinder block having a water cooling space 25.

As shown in Fig. 2, the valve insert 10 has been chilled to reduce its diameter. Cylinder block 18 has also been heated to expand the recess 17, the proportionate chilling of insert 10 and heating of cylinder block 18 being such that the rounded corner 16 of said insert will just clear the rounded corner 23 of said recess, as said insert is moved downwardly and the corner 16 moves in the plane represented by the line A—A. As soon as insert 10 has seated on the bottom seating face 21 of said recess, the exchange of heat between the insert and said cylinder block will equalize the temperatures thereof, said cylinder block contracting and said insert expanding to the position shown in Fig. 3, thereby becoming permanently interlocked, the frusto conical faces 11 and 19 in combination with the seating faces 12 and 21 acting to form said interlocking. During the inserting operation insert 10 is supported by a suitable tool 77 which is immediately removed after said insert has interlocked in said recess as more fully hereinafter described.

The degree of taper or bevel of frusto conical interlocking faces 11 and 19 depends upon several factors including the thickness or depth of insert 10, the relative materials from which said insert and cylinder block 18 are made, the relative differential heat treatments of these parts and the operating temperature of said inserts and said cylinder block during normal service.

The clearance groove 20 is preferably made wide enough to catch any chips or particles which may be sheared or rubbed off as the rounded corners 16 and 23 pass each other during the assembly operation. Whereas the differential heat treatment is such that the rounded portions 16 and 23 pass each other without restriction if all factors including said treatment, material and machining is accurate, any inaccuracy in any one of said factors may cause shearing between said corners 16 and 23, the sheared particles falling into said groove 20, thereby permitting accurate seating of the bottoming faces 12 and 21 and preventing a separation therebetween. It is to be noted that the outer wall of groove 20 forms a continuation of the frusto conical interlocking face 19 which also permits a more ready machining of the recess 17.

Referring to Fig. 5 showing a modified embodiment of the invention, cylinder block 18 is formed with the hereinbefore described frusto conical interlocking face 19 arranged to engage correlated frusto conical interlocking face 11 of valve seat insert 10, but is modified as to the clearance groove 30 in cylinder block 18, the lower wall 31 of which is angularly disposed with respect to seating face 12 and extends upwardly to a point spaced between the inner and outer edges of said seating face on insert 10, thereby forming a truncated clearance space between the said wall and said seating face 12, said seating face 12 having a seating engagement with annular seating face 32 of said block.

Referring to Fig. 6 showing another modified embodiment of the invention similar to Figs. 2, 3 and 4, the structure further includes an annular clearance groove 35 whereby a plurality of seating faces 36 are arranged to engage the seating face 12 of valve insert 10.

Referring to Fig. 7 showing another modified embodiment of the invention, cylinder block 18 is formed with the hereinbefore described frusto conical face 19 engaging correlated frusto conical face 11 of insert 10; however the clearance groove 37 is formed in a plane parallel to the seating face 12 of said insert, a resilient gasket or angle washer 38 having the flange portion 39 thereof interposed between seating face 12 of said insert and seating face 40 of said cylinder block, the cylindrical portion 41 of said gasket extending downwardly into gas opening 22.

Referring to Fig. 8 showing another modified embodiment of the invention, cylinder block 18 is formed with the hereinbefore described frusto conical face 19 and seating face 21, said faces being joined independently of a clearance groove as 20, 30 or 37. However, valve insert 44 formed with a recess or groove 43 at the juncture of frusto conical face 11 and bottom seating face 12, said recess or groove acting as a clearance groove to permit accurate seating of faces 12 and 21.

Referring to Fig. 9 showing another modified embodiment of the invention similar to Fig. 7, the frusto conical face 19 and seating face 21 are joined, the clearance groove 37 of Fig. 7 being omitted and the outside diameter of washer 38 being sufficiently reduced to form clearance groove 46.

Referring to Fig. 10 showing another embodiment of the invention, cylinder block 18 is formed with a cylindrical recess 50 having a plurality of spaced cylindrical faces 51 alternating with a plurality of spaced seating grooves 52. At the bottom of said recess 50 is formed clearance groove 53, the outer wall of which forms a continuation of the lower cylindrical face 51. Valve insert seat 55 is formed with bottom seating face 12, gas opening 13, valve seat 14 and top face 15. Said insert also includes spaced seating rings or annular portions 56 extending beyond cylindrical faces 57 arranged to enter and engage seating groove 52 when said insert is expanded after assembly as more fully hereinafter described. It is to be noted that the seating grooves 52 are independent one from the other as distinguished from a screw thread. Whereas only two grooves as 52 and correlated ring portions as 56 are shown, any number of said grooves and ring portions may be employed and they may be in juxtaposition one to the other, and the form thereof may be varied.

Referring to Figs. 11, 12, 13, 14, 14a and 15, inclusive, showing the method or process of applying valve seat inserts, as 10, to cylinder blocks, as 18, conveyor 60 is arranged to advance a plurality of said cylinder blocks into the "heat oven" for heat treatment thereof, after which said blocks emerge through opening 61 and pass to valve seat inserting chamber 62. Conveyor 60 is advanced by a suitable motor and gearing 60a, its advance being automatically halted by the opening of circuit closer 95 as more fully hereinafter described. Cylinder blocks 18 are loaded against stop pins 65, which together with the operation of circuit closer 95, act to halt said block in the proper location for having the valve seat inserts inserted therein. The pins or stop members 65 register with indicator 66 when said conveyor is halted, thereby indicating that said blocks are in the proper position and after which the cylinder block aligning handle 64 is moved to the extreme lower position, thereby moving aligning members 67 and 68 into engagement with said block for aligning the valve seat recesses 17 thereof with the valve seat inserting unit 75. Aligning members 67 and 68 are suitably guided in movement by fixed members 69 and 70 and said blocks are preferably aligned through the cylinder bores thereof, said aligning members 67 and 68 being arranged to enter the upper and lower ends of the extreme bores of a cylinder block, as shown. Said aligning members 67 and 68 are operated by pivotally supported levers 71 and 72 link-connected to pivotally supported aligning crank 73, which may be locked in the aligned position by a removable pin 74, passing therethrough into an opening of a fixed boss. Aligning member 67 is supplied with tapered or conical openings 67a (see Fig. 2) for guiding each of the inserts, as 10, into its correlated recess in the cylinder block 18.

Valve seat inserting unit 75 comprises in part, insert holder support 76, supporting insert holders 77 therebelow, said holders having operating rods or shafts 78 passing through fixed bearing members 79 thereabove, said shafts being connected by a bridge member 80 at the upper end thereof. Unit 75 is reciprocated by slotted lever 81, pivoted at 82, and operated by pick-up, chilling, and inserting operating crank 83, hereinafter termed inserting crank 83, said crank being pivoted on fixed pin 84 and operated by handle or operating member 85. Inserting crank 83 has a detent 86 arranged to receive dog 87 of locking bolt 88 when solenoid 89 is energized by push button 90, spring 91 normally holding bolt 88 to the release position.

Lever 81 is arranged to be power-operated during the valve seat inserting portion of movement of said lever, said movement being effected by power-operated device 92, which may comprise an electrical device 92, including a power-operated member 93, pivotally connected to lever 81. Lever 81 is normally retracted to the position shown by a resilient member 81a. The energizing of power-operated device 92 is effected by closing circuit breaker 94 during the final or valve seat inserting portion of the movement of crank 83 as it is rotated clockwise.

Pick-up and chilling unit 96 comprises valve seat insert pickup shoe or block 97 secured to and operated by operating rods 98 slidable in bearing 99—99, said rods being adjustably connected by bridge member 100 to which one end of actuating rod or link 101 is pivotally connected, the other end of said link being pivotally connected to the free end of shifter crank 102 operated by handle or operating member 103, said crank being pivotally supported by fixed pin 102c.

Shoe 97 is arranged to slidably receive tray or supporting unit 104 having recesses arranged to receive valve seat inserts, as 10, in properly spaced relation, the spacing of said recesses being correlated to the spacing of the valve seat insert recesses in the cylinder blocks, as 18, the spacing of holders 76 also registering with said spacing. Tray 104 is manually fed into shoe or block 97 through an opening in the wall of pickup and chilling chamber 105, by handle 104a.

Pick-up and chilling unit 96 also comprises chilling tray or unit 107, secured to and operated by rods 98, said unit having a lower or chilling compartment 108 containing a chilling agent, as for example, temperature controlling liquid air, and an upper or chilled liquid compartment 109 containing a light fluid oil, as for example, kerosene, into which said inserts are immersed for chilling.

Chambers 62 and 105 are preferably surrounded by an enclosure or wall structure 110, preferably formed in part of caloric insulating material for heat insulating said chambers, chamber 62 having an inspection opening, 111, which may include a transparent door or window. Opening 112 permits movement of valve seat insert unit 75 from the pick-up and chilling chamber 105 to the valve seat inserting chamber 62, and this opening is closed by the shoe 97 or the chilling unit 107 during the pick-up and chilling periods.

Referring to Fig. 13 showing one form of valve seat insert holder 77, solenoid 115 is arranged to establish a magnetic circuit through armature 116, washer 117, tube 118 to valve seat insert 10 and thence to enlarged head 119 of armature 116, the washer 120 being non-magnetic, whereby said insert forms the magnetic bridge across the air gap. Solenoid 116 is included in an energized circuit controlled by conventional switch 121 having operating lever 121a moved to the energized position by cam face 121c of cam 81b formed on lever 81 during the final movement of operating handle 85 to its upper position thereby energizing solenoids 116 whereby inserts, as 10, may be supported thereby when holders 77 are inserted thereinto. Upon movement of handle 85 to the extreme lower position thereof for inserting said inserts, cam face 121b will act to move switch lever 121a to the right, or deenergized position thereby cancelling flow of energy to solenoids 116 whereby holders 77 may be raised for a new supply of said inserts. Switch lever 121a is only operated during the final movements of operating handle 85.

Referring to Fig. 14 showing another form of valve seat insert holder 77 for use when inserting non-magnetic inserts, as for example tungsten-carbon-copper alloy inserts, the nose portion 122 is slotted to receive chuck jaws 123, normally urged radially outwardly by springs 124, said jaws having beveled end portions 125 to guide said holder into said inserts during the picking-up operation. Said jaws are prevented from axial movement by extensions 126, slidable radially between the upper end of nose portion 122 and disc 127.

*Operation*

The preferred mode of inserting valve seat inserts, as 10, is as follows:—Assuming a set of inserts has been inserted into a cylinder block (not shown) in advance of block 18 and that conveyor 60 has moved said inserted block out of register with inserting mechanism or unit 75, at the same time moving block 18 into register with said mechanism, and that the opening of circuit closer 95 has acted to halt said block in register with said mechanism, as shown, and that said mechanism is in the upper or retracted position, as shown, and that tray 104 is filled with a set of inserts 10, as shown, and has been slid into shoe 97. Also assuming that aligning members 67 and 68 are in retracted position and that handle 64 after having been rotated counter clockwise against stop 64c for closing circuit closer 63 to energize said conveyor motor, has been rotated clockwise by spring 64b sufficiently to open said circuit closer 63, said handle being assumed to be engaging the end of said spring, in extended position, handle 64 is now rotated clockwise, thereby forcing said aligning members 67 and 68 into the cylinder bores of block 18, thereby performing the double action of aligning said block in register with inserting mechanism 75 and also locking said block against movement during the inserting operation, said handle 64 engaging pin or stop 64a, whereupon aligning lever 73 may be locked by insertion of pin 74 therethrough, as hereinbefore described.

Preferably during the cylinder block advancing, halting, and aligning operation, as described, the shifter handle, 103, is rotated clockwise against stop 102b thereby moving shoe 97 over opening 112, the inserts in said shoe now being in register with inserting mechanism 75. Stops 102a and 102b are preferably adjustable for adjustably obtaining proper register. Handle 85 is now rotated to the intermediate position, thereby moving mechanism or unit 75 downwardly, the holders 77 entering into the inserts and becoming attached thereto. Handle 85 is now moved to the upper position, rotating lever 83 counter-clockwise and thereby raising said valve seat inserting unit 75, including said inserts, to the position shown. Shifter handle 103 is now rotated counterclockwise to stop 102a, whereby chilling tray 107 moves over and closes opening 112. Handle 85 is again moved to the intermediate position thereof and may be locked therein by detent 87 if desired, said movement acting to move holders 77 and inserts 10 into the chilling solution in compartment 109 for the chilling thereof to shrink said inserts in diameter. Since the operation of picking-up inserts 10 from tray 104 and the shifting of said shoe or block 97 and tray 107, and the insertion of said inserts into compartment 109 requires less time than the retraction of aligning members 67 and 68, the advance of block 18 and re-alignment thereof by said aligning members, said inserts are permitted to remain in said chilling compartment until a new cylinder block, as 18, has been aligned and locked in position, as shown, and assuming this has been done, handle 85 is moved to the upper position, thereby raising unit 75 and inserts 10 out of the chilling tray 107, and preferably simultaneously the shifter handle 103 is rotated clockwise to the intermediate position shown, thereby moving chilling tray 107 from over opening 112, whereafter handle 85 is moved to the lower position, thereby rotating crank 83 clockwise, the final movement thereof to stop 83b acting to close circuit breaker 94, thereby energizing power operated device 92. Rotation of crank or lever 83 acts to move inserting unit 75 downwardly, the action of power operated device 92 becoming effective as said inserts are being inserted in recesses 17 of the aligned cylinder block 18, thereby insuring that said inserts are properly seated.

Whereas the various described operations have been indicated as manual unless otherwise stated, all of said operations may be automatic, each operating handle, as 64, 85, and 103, being operated by a motor controlled by a multiple circuit circuit breaker, as for example, circuit breakers of the form employed for sign flashing, and wherein a motor rotates a drum having a plurality of contacts engaged by stationary contacts or arranged to operate suitable circuit controllers, said automatic operation including the insertion and withdrawal of tray 104, and may include the automatic insertion of inserts, as 10, into said tray. However, the loading of said tray is preferably manual for the purpose of insuring that the said inserts are properly placed therein.

After insertion of valve seat inserts, as described, cylinder blocks 18 emerge through opening 113 and are deposited onto a suitable table or succeeding conveyor (not shown) to be moved to the point of next operation on said block.

The conveyor 60 is preferably made in three spaced belts whereby the aligning members 68—68 may be reciprocated in said spaces independently of said conveyor.

After a set of inserts has been inserted into the cylinder block 18, as described, the aligning handle 64 is rotated counter-clockwise to the adjustable stop 64c, this movement acting to withdraw the aligning members 67 and 68, the final clockwise movement thereof engaging spring 64b and circuit closer 63. As circuit closer 63 is closed, the circuit to the conveyor motor 60a is established and blocks 18 and conveyor 60 begin to move to the right, said movement acting to move stop 65 out of engagement with circuit closer 95, whereby said last-named circuit closer also establishes a circuit to said conveyor motor and whereafter handle 64 is released, the spring 64b acting to move handle 64 sufficiently to open circuit controller 63 but not to effect any appreciable movement of aligning members 67 and 68 in their retracted position. Circuit closers 63 and 95 are in multiple circuit with said conveyor motor and the source of energy therefor, whereby the closing of either of said circuit closers will act to energize said motor. After the closing of circuit closer 95, said circuit closer remains closed until a succeeding stop 65 has advanced sufficiently to open the same, said circuit closer being adjustably positioned and the adjustment thereof being made whereby said stop 65 acts to open said circuit closer when a cylinder block, as 18, is in register with valve seat inserting unit 75. However, since it is impossible to secure accurate register of said unit and block through movement of said conveyor solely, the aligning mechanism, including aligning members 67 and 68 is provided for the more accurate aligning of said unit and block.

The embodiments of the invention shown in Figs. 7 and 9 are preferably employed under conditions of continued pressure on a valve seated on the inserts 10, and under which conditions the resilient packing washers 38 act to form a gas or liquid tight seal. Under certain conditions the machining of the recess 17 is such that the insert 10 is free to rotate on gaskets 38 when no downward pressure is exerted thereagainst by said valve, the frusto conical interlocking faces 11 and 19 acting to permanently prevent removal of said inserts from said cylinder block.

The embodiment shown in Figs. 2, 3, 4, 5, 6 and 8 are preferably employed under conditions of intermittent pressure on a valve seating on insert 10 and particularly when said valve is rapidly seated and unseated on said insert, and under which conditions recess 17 and said insert are so proportioned that said insert is locked against movement after the insertion thereof in accordance with the method described herein.

The embodiment shown in Fig. 10 is preferably employed under conditions of intermittent pressure on a valve seating on insert 55 and under conditions where the temperature of said insert and cylinder block 18 is not greatly varied differentially during operating conditions.

Whereas link 101 has been shown as directly connected to bridge member 100 in Fig. 12, it is to be understood that a rod or shaft may be interposed therebetween, said rod being adjustable with respect to said bridge and pivotally connected to link 101, as shown in Fig. 11.

It is to be understood, that whereas cylinder blocks, as 18, have been shown as heat treated and conveyed to receive valve seat inserts, various other forms of metal bodies, as for example, the cylinder heads correlated to said blocks and into which valve seat inserts may be inserted for inlet valves to be operated therein, may be treated in the same manner as blocks 18.

What I claim is:

1. In a system for inserting valve seat inserts into a cylinder block or similar metal bodies having a plurality of spaced correlated valve seat insert recesses for receiving said inserts, valve seat insert mechanism including means for supporting a plurality of valve seat inserts in the same spaced relation as the spacing of said recesses, means including valve seat insert pick-up apparatus for positioning a plurality of loose valve seat inserts in the same spaced relation as the spacing of said recesses, means for moving said pick-up apparatus into and out of register with said mechanism, and means for operating said mechanism to pick up said loose inserts from said pick-up apparatus when said apparatus is in register with said mechanism and to clear the way for insertion of said picked up inserts into said recesses when said pick-up apparatus is out of register therewith.

2. In a system for inserting valve seat inserts into a cylinder block or similar metal bodies having a plurality of spaced correlated valve seat insert recesses for receiving said inserts, valve seat insert mechanism including means for supporting a plurality of valve seat inserts in the same spaced relation as the spacing of said recesses, means for positioning said cylinder blocks in register with said mechanism whereby said inserts may be inserted into said recesses, means including a chilling apparatus for lowering the temperature of said inserts upon engagement therewith, means for moving said chilling apparatus into and out of register with said mechanism, and means for operating said mechanism to effect engagement of said inserts with said chilling apparatus when said apparatus is moved into register with said mechanism and to effect insertion of said inserts into said recesses when said apparatus is moved out of register therewith.

3. In a system for inserting a plurality of valve seat inserts into a plurality of similar cylinder blocks or similar metal bodies each having a plurality of spaced correlated recesses for receiving said inserts, means including an oven for heating said cylinder blocks, means including a conveyor for advancing said blocks through said oven for said heat treatment thereof, valve seat insert mechanism including means for supporting said inserts operative to effect insertion thereof into said recesses after said blocks have been conveyed through said oven, means for locking said blocks in register with said mechanism, and means for operating said mechanism to insert said inserts into said recesses while said blocks are in locked register with said mechanism.

4. In a system for inserting a plurality of valve seat inserts into a plurality of similar cylinder blocks or similar metal bodies each having a plurality of spaced correlated recesses for receiving said inserts, means including an oven for heating said cylinder blocks, means including a conveyor for advancing said blocks through said oven for said heat treatment thereof, valve seat insert mechanism including means for supporting said inserts operative to effect insertion thereof into said recesses after said blocks have been conveyed through said oven, means for locking said blocks in register with said mechanism, means for chilling said inserts while supported by said mechanism prior to the insertion thereof, means for withdrawing said chilling means, and means for operating said mechanism to insert said chilled inserts into said heated recesses while said cylinder blocks are in locked register with said mechanism.

5. In a system for inserting a plurality of valve seat inserts into a plurality of cylinder blocks or similar metal bodies each having a plurality of correlated spaced recesses for receiving said inserts, means including an oven for heating said blocks, means including a conveyor for advancing said blocks through said oven for heat treatment thereof, a chamber into which said blocks advance after being heat-treated, valve seat insert mechanism including means for supporting said inserts operative to insert said inserts into said recesses while in said chamber, means for locking said blocks in fixed register with said mechanism while in said chamber, and means for operating said mechanism to insert said inserts into said recesses while said blocks are in locked register therewith.

6. In a system for inserting valve seat inserts into cylinder blocks or similar metal bodies having a plurality of spaced recesses for receiving said inserts, holders including means for supporting said inserts thereon, mechanism operative to move said holders for inserting said inserts into said recesses, means including a conveyor to support a plurality of said blocks out of register with said mechanism for successive movement of said blocks into register therewith, means on said conveyor for positioning said blocks at predetermined locations thereon, means to advance said conveyor for intermittently moving said blocks successively into register with said mechanism, and means to operate said mechanism to move said holders for inserting said inserts into said recesses while said blocks are in register therewith.

7. In a system for inserting valve seat inserts into cylinder blocks or similar metal bodies, valve seat insert inserting mechanism including means for supporting and inserting said inserts into said blocks, means including a conveyor for supporting a plurality of said blocks in spaced relation out of register with said mechanism, means including a motor for advancing said conveyor to successively move each of said blocks into fixed register with said mechanism, means to operate said motor to advance said conveyor, and means responsive to the advancement of said conveyor for stopping the operation of said motor when said blocks are in register with said mechanism.

8. In a system for inserting valve seat inserts into cylinder blocks or similar metal bodies having a plurality of spaced recesses for receiving said inserts, holders including means for supporting said inserts thereon, mechanism operative to move said holders for inserting said inserts into said recesses, means including a conveyor movable in a plane angularly disposed to the plane of movement of said holders for intermittently advancing a plurality of said blocks successively into substantial register with said mechanism for receiving said inserts, means for holding said blocks in fixed register with said mechanism independently of said conveyor after being moved into substantial registry therewith by said conveyor, and means to operate said mechanism to move said holders for inserting said inserts into said recesses while said blocks are in register therewith.

9. In a system for inserting a plurality of valve seat inserts into cylinder blocks or metal bodies having a plurality of spaced openings for receiving said inserts, valve seat insert inserting mechanism including holders for supporting a plurality of said inserts in the same spaced relation as the spacing of said openings, means for operating said mechanism to move said holders toward said openings for inserting said inserts into said openings, means including a conveyor for supporting a plurality of said blocks thereon for movement past said mechanism, means for advancing said conveyor to successively move each of said blocks into substantial registry with said mechanism and then halt the advance thereof, means for holding said blocks in fixed register with said mechanism independently of said conveyor, and means to operate said mechanism for moving said holders to insert said inserts into said openings during the halted periods of said conveyor.

10. In a system for inserting inserts into cylinder blocks or similar metal bodies having a plurality of spaced openings for receiving said inserts, holders including power operated means for securing said inserts thereto, means for positioning said cylinder blocks with said openings in alignment with said holders, mechanism operative to move said holders toward and away from said openings for inserting said inserts thereinto, and means controlled by said mechanism for energizing said power operated means during the final movement of said holders when moved away from said openings and deenergizing said power operated means during the final movement of said holders when moved toward said openings.

OSCAR A. ROSS.